United States Patent [19]

Pitha et al.

[11] Patent Number: 5,173,481

[45] Date of Patent: Dec. 22, 1992

[54] PREPARATION OF SPECIFICALLY SUBSTITUTED CYCLODEXTRINS

[75] Inventors: Josef Pitha, Baltimore, Md.; C. Trinadha Rao, Visa Khapatnam, India; Bengt Lindberg, Stockholm, Sweden

[73] Assignee: The United States of America as represented by the Department of Health and Human Services, Washington, D.C.

[21] Appl. No.: 544,546

[22] Filed: Jun. 28, 1990

Related U.S. Application Data

[63] Continuation-in-part of Ser. No. 332,606, Apr. 3, 1989, abandoned.

[51] Int. Cl.⁵ .................. C08B 37/16; A61K 31/70
[52] U.S. Cl. ........................... 514/58; 536/103
[58] Field of Search .................. 536/103; 514/54

[56] References Cited

U.S. PATENT DOCUMENTS

| | | | |
|---|---|---|---|
| 3,459,731 | 8/1969 | Gramera et al. | 536/103 |
| 4,020,160 | 4/1977 | Bernstein et al. | 536/103 |
| 4,247,535 | 1/1981 | Lewis et al. | 536/103 |
| 4,582,900 | 4/1986 | Brandt et al. | 536/103 |
| 4,638,058 | 1/1987 | Brandt et al. | 536/103 |
| 4,727,064 | 2/1988 | Pitha | 514/54 |
| 4,840,941 | 6/1989 | Ueno et al. | 514/54 |
| 4,877,778 | 10/1989 | Carpenter et al. | 514/54 |
| 4,912,093 | 3/1990 | Michaeli | 514/54 |
| 5,019,562 | 5/1991 | Folkman et al. | 536/103 |

*Primary Examiner*—Ronald W. Griffin
*Attorney, Agent, or Firm*—Birch, Stewart, Kolasch & Birch

[57] ABSTRACT

A process for producing monosubstituted alpha-, beta-, and gamma-cyclodextrins includes the step of condensing an excess of a cyclodextrin with an epoxide under alkaline conditions. A process for increasing the solubility of cyclodextrins includes the step of reacting a cyclodextrin with an amine under heterogenous catalytic conditions, or subjecting the cyclodextrin to sulfatation. Compositions useful in these processes include one containing at least one cyclodextrin, ammonia and Raney nickel, and a second composition containing at least one cyclodextrin, chlorosulfonic acid and pyridine.

15 Claims, 4 Drawing Sheets

A B C D E F G 1　2　2+3　3

PREPARATION OF SPECIFICALLY SUBSTITUTED CYCLODEXTRINS

This application is a continuation in part of U.S. patent application Ser. No. 07/332,606, now abandoned, filed by J. Pitha and B. Lindberg for the U.S. Government on Apr. 3, 1989.

BACKGROUND OF THE INVENTION

1. Field of the Invention

The present invention is directed to a process for producing monosubstituted cyclodextrins, a process for increasing the solubility thereof and compositions containing the same.

2. Description of Related Art

In many applications of cyclodextrins the use of mixtures of derivatives are preferred to the use of a chemically individual compound. The previous patent application by J. Pitha and B. Lindberg, described the use of controlled basic conditions to provide such mixtures but substituted in a side-specific manner. The background section of the former application describing the previous art is to be considered common with the present report. The mentioned controlled basic conditions have presently been used to prepare monosubstituted cyclodextrins. In these preparations the ability of cyclodextrins (in this context called host compounds) to form crystalline complexes of low solubility with a variety of organic compounds (called guest compounds) was used. This ability is well-known, e.g., F. Cramer and F. R. Henglein (*Chem. Berichte* 90, 2561-1571, 1957) described fifty examples of complexes of parent cyclodextrins; nevertheless, this ability has not been used to fractionate cyclodextrin derivatives.

The techniques used to replace hydroxy groups with amino groups using heterogenous catalysts were the subject of many publications and patents, and amino derivatives of polyethylene and propylene glycols are currently made by a similar process on an industrial scale (E. L. Yeakey, U.S. Pat. No. 3,654,370). A similar replacement has not been attempted on cyclodextrins. The only instance when cyclodextrins were treated with heterogenous catalyst (Raney nickel) was in the preparation of cyclodextrins deuterated on carbon atoms (Y. Kuroda, M. Yamada, and I. Tabushi, *Tetrahedron Lett.* 29, 4467-4470, 1988). Cyclodextrin sulfates have been known for a number of years (e.g., J. Hamuro and M. Akiyama, Japan Kokai 75 36 422, 1975, *Chem. Abst.* 83, 29026v, 1977; S. Bernstein, J. P. Joseph, and V. Nair, U.S. Pat. No. 4,020,160, 1977) and in all their preparations principally similar methods have been used. The only factor requiring investigation in the preparation of hydroxypropylcyclodextrin sulfates was to find whether the presence of the substituent in question would not lead to a partial decomposition which would lead to an unremovable and unacceptable coloration in the products.

SUMMARY OF THE INVENTION

The ability to prepare specifically substituted cyclodextrins widens the scope of their uses. Depicted in FIG. 1 is the structure and numbering system of cyclodextrins and obviously these compounds may be substituted in a number of different ways. In the parent continuation-in-part application noted above it was shown that in substitution reactions of cyclodextrins catalyzed by bases, low concentrations of bases favor substitution on secondary, more acidic hydroxyls, whereas high concentrations of bases favor primary hydroxyls which are more accessible. In the previous application only the use of $\beta$-cyclodextrin, propylene oxide, and sodium hydroxide were described. Here, we widen these principles to $\alpha$- and $\gamma$-cyclodextrin, and to the use of alternative bases and epoxides. Furthermore, we show that extension of these principles enables the preparation of monosubstituted cyclodextrins without resorting to chromatography. Interestingly the problem of low solubility which occurs in parent cyclodextrins was again encountered with some of the monosubstituted cyclodextrins. That problem was remedied by the exchange of a hydroxy group of cyclodextrin for an amino group by action of ammonia and metal catalyst. That reaction, the occurrence of which was difficult to prove when only complex mixtures were available, indeed occurs easily. Furthermore, sulfatation with chlorosulfuric acid was used to improve the solubility of the substituted cyclodextrins. Thus, the scope of cyclodextrin derivatives accessible in technical quantities was broadened.

DETAILED DESCRIPTION OF THE INVENTION

Figure 1C:
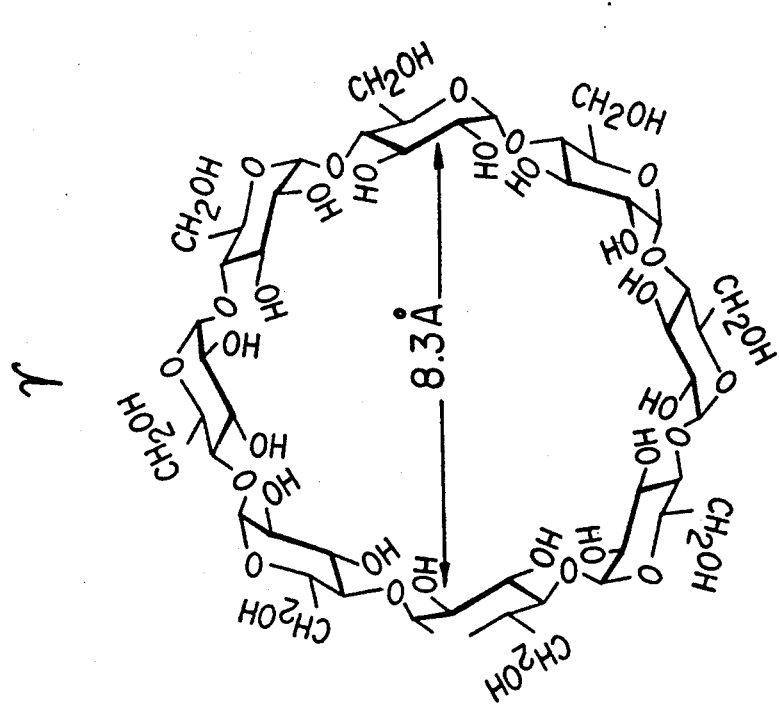
FIG. 1 shows alpha, beta and gamma cyclodextrins and the system for numbering the glucose units therein.
Figure 1B:
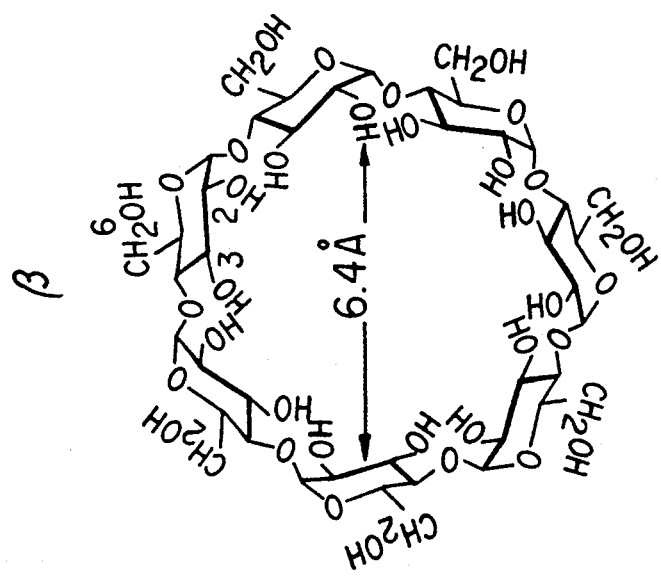
Figure 1A:
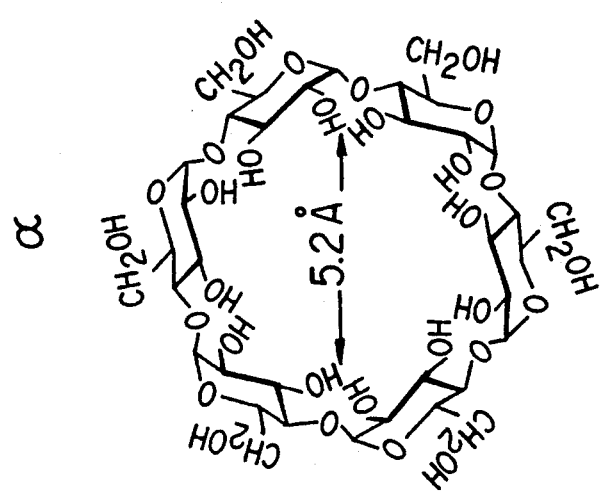

All three of the cyclodextrins (FIG. 1) can be substituted in a specific manner if controlled basic conditions are used; that is documented by the similarities seen in the distributions of products of $\alpha$-, $\beta$-, and $\gamma$-cyclodextrins (Table 1). The data there consist of results obtained with $\alpha$-cyclodextrin (Example 1), $\beta$-cyclodextrin (patent application of J. Pitha and B. Lindberg), and $\gamma$-cyclodextrin (Example 2); in all these reactions propylene oxide was used as an alkylating agent. It may be noted that $\alpha$-cyclodextrin, in difference to $\beta$- and $\gamma$-homolog, forms a crystalline compound with propylene oxide; nevertheless, that had only minor effects on the course of the reaction.

To evaluate the effects of the ratio of cyclodextrin to propylene oxide used in condensation, a factor which regulates the average degree of substitution in products, the experiment described in Example 3 was performed. Catalysis by low sodium hydroxide concentration (1.5%) was used and a product with an average degree of substitution of 6.6 was obtained. The composition of that product was compared with that of previously obtained product (Pitha and Lindberg, l.c.), but of an average degree of substitution 2.0 (Table 2). Comparison shows that substitution in position 2 remains predominant. The only distinct difference observed was the pronounced disappearance of the product monosubstituted in position 3 as the reaction progressed. This obviously had to be due to the high reactivity of that compound to propylene oxide.

Controlled basic conditions in the condensation reaction can be obtained using various hydroxides. Equinormal lithium, potassium, tetramethylammonium, and barium hydroxide was used in Example 4, respectively. Analytical composition of the products, summarized and compared with those obtained using sodium hydroxide catalysis in Table 3, show only minor differences. Qualitative assessment by thin layer chromatography (FIG. 2) indicates that the mixture obtained by barium hydroxide catalysis is remarkably simple.

Figure 2:
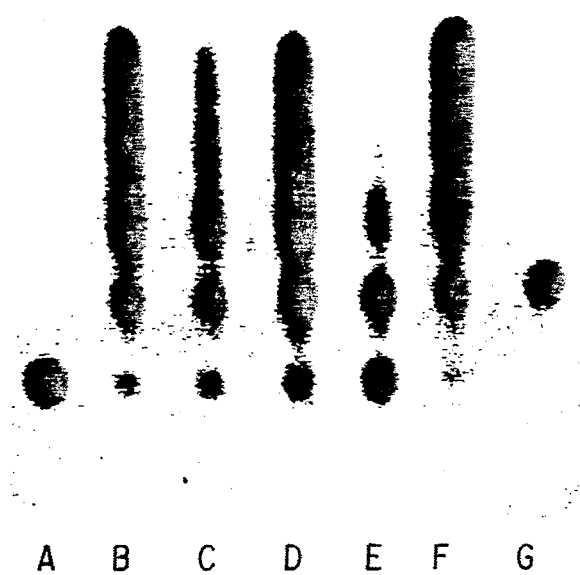
FIG. 2 is a thin layer chromatogram of the (S)-2-hydroxypropyl derivatives obtained upon reaction of beta-cyclodextrin with propylene oxide using different bases as catalysts.

FIG. 2 shows a thin layer chromatograph of the (S)-2-hydroxypropyl derivatives obtained upon reaction of beta-cyclodextrin with propylene oxide using different bases as catalysts as follows: (A) beta-cyclodextrin; (B)-(F) are reaction products using different bases as catalysts ((B)—LiOH, (C)—NaOH, (D)—KOH, (E)—Ba(OH)$_2$, and (F)—NMe$_4$OH); (G) standard 2-O-((S)-2'-hydroxypropyl)-beta-cyclodextrin. A precoated silica gel plate (60F$_{254}$, Merck Co.) was used and developed by 1-propanol-water-ethyl acetate ammonium hydroxide at a ratio of 6:3:1:1. The results were visualized by heating the plate stained by immersion into Vaughn's reagent (a solution of ammonium molybdate, 24 g and ceric sulfate, 1 g, in aqueous sulfuric acid, 10% 500 ml).

Figure 3:
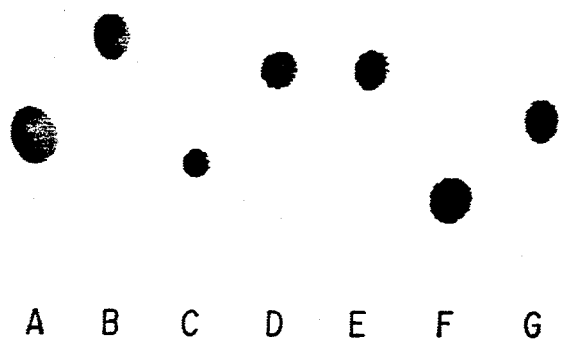
FIG. 3 is a thin layer chromatogram of cyclodextrins and the products from monoalkylation thereof with propylene oxide.

To obtain monosubstituted cyclodextrin derivatives large excesses of cyclodextrins were used in condensation reactions with epoxides. These conditions led to mixtures consisting principally of the starting cyclodextrin and of its monosubstituted product, and these mixtures were easier to separate than mixtures containing oligosubstituted products. Preparation of monosubstituted β-cyclodextrin is described in Example 5, Table 4. (S)-Propylene oxide, (R)-propylene oxide, and (R,S)-propylene oxide and catalysis by low alkali concentration were used there. In this case the substitution occurred in the O-2 position of cyclodextrins (Table 5); all three products were crystalline. Preparation of monosubstituted α- and γ-cyclodextrin described in Example 5 and Table 4 yielded products which were about equimolar mixtures of compounds carrying substituents on the 2-O- and 3-O-positions (Table 5) and separable only by chromatography. These products were amorphous. The difference between β-cyclodextrin and, on the other hand, α- and γ-cyclodextrin is probably due to the very low solubility and good crystallization ability of 2-O-(2-hydroxypropyl)-β-cyclodextrin, enabling easy isolation. The corresponding derivative substituted in position 3 probably remained in the mother liquor. The thin layer chromatogram of the monosubstituted product is shown in FIG. 3. FIG. 3 depicts a thin layer chromatogram of cyclodextrins and products from the monoalkylation thereof with propylene oxide (aqueous 1.5% NaOH used as solvent and catalyst) as follows: (A) alpha-cyclodextrin; (B) mono((S)-2'hydroxypropyl)-alpha-cyclodextrin; (C) beta-cyclodextrin; (D) 2O-((S)-2'-hydroxypropyl)-beta-cyclodextrin; (E) 2-O-((R)-2'-hydroxypropyl)-beta-cyclodextrin; (F) gamma-cyclodextrin; (G) mono((S)-2'hydroxypropyl-gamma-cyclodextrin. The experimental conditions employed were the same as those used for the results described in connection with FIG. 2 above.

To document that a product monosubstituted in position 6 can be prepared analogously the reaction described in Example 6 was performed; β-cyclodextrin was condensed with (S)-propylene oxide using a high concentration of alkali. The monosubstituted product in that case, when toluene was used as a complexing agent, coprecipitated with β-cyclodextrin. From mass spectrum of the reaction mixture and comparison of the thin layer chromatography properties of authentic 2-O-substituted product (FIG. 4) it is obvious that the product is different from 2-O-(2-hydroxipropyl)-β-cyclodextrin. On the basis of the data in the previous application the product has to be 6-O-(2-hydroxypropyl)-β-cyclodextrin.

Figure 4:
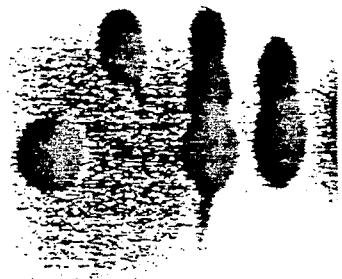
FIG. 4 is a thin layer chromatogram of the reaction products of beta-cyclodextrin with S-(−)-propylene oxide, 2-O-((S)-2'-hydroxypropyl)-beta-cyclodextrin, and beta-cyclodextrin.

FIG. 4 shows a thin layer chromatogram of the reaction products of beta-cyclodextrin with S-(−)-propylene oxide catalyzed by 30% D/D aqueous sodium hydroxide, wherein this path is identified by number "3"; 2-O-((S)-2'-hydroxypropyl)-beta-cyclodextrin, path "2"; beta-cyclodextrin, path "1"; and a mixture of the components from paths 2 and 3 identified as path "2+3." The experimental conditions employed were the same as those described in connection with the results discussed for FIG. 2.

To document that the processes developed are applicable when other epoxides are used the condensation of (S)-glycidol with β-cyclodextrin catalyzed by a low alkali concentration was performed (Example 7). The crystalline 2-O-(2,3,-(S)-dihydroxypropyl)-β-cyclodextrin was isolated without difficulty.

Since with chemically individual derivatives of cyclodextrins a problem a low solubility was again encountered, a procedure was developed for simple chemical conversion to more soluble compounds, a procedure applicable to both cyclodextrins and their derivatives. The procedure consists of the reaction of cyclodextrins with amines under heterogeneous catalysis and is described in Example 8. While only the combination of 2-O-[(S)-2-hydroxypropyl]-β-cyclodextrin, ammonia, and Raney nickel is described presently the applicability is not limited to only these compounds. An alternative modification of the above compounds which may become useful in this context is sulfatation. That chemical modification was found to yield colorless materials and thus was suited for various applications (Example 5).

EXAMPLE 1

Preparation of (S)-2-Hydroxypropyl-α-Cyclodextrin Mixture

α-Cyclodextrin (5.41 g hydrate, equivalent to 4.78 g anhydrous, i.e., 5 mmol) was dissolved in aqueous sodium hydroxide (5%, 14.2 g), the solution cooled in an ice bath, and (S)-propylene oxide (3.48 g, 60 mmol) was added slowly. During the addition a precipitate of propylene oxide: α-cyclodextrin complex formed temporarily. The stoichiometry of that complex (determined by nuclear magnetic resonance spectra) was close to 1:2. The mixture was stirred at 0° C. for 6 h and at room temperature for 11 h. Then after neutralization by hydrochloric acid and dialysis against distilled water for 5 h the retained product was isolated by evaporation, yielding 5.1 g of white powder.

For analysis of the substitution pattern the product (2.5 g) was fully methylated by a methyl iodide:-dimethyl sulfoxide:sodium hydride procedure as described in a previous patent application by Pitha and Lindberg. After short column chromatography (methylene chloride-methanol, 20:1, as eluent) permethylated derivative (2.96 g) was obtained. The fully methylated derivative was hydrolyzed, reduced, acetylated, and the resulting mixture analyzed by gas-liquid chromatography:mass spectrometry as described previously (Pitha and Lindberg, l.c.).

EXAMPLE 2

Preparation of (S)-2-Hydroxypropyl-γ-Cyclodextrin Mixture

γ-Cyclodextrin (15.05 g hydrate, i.e., 12.97 anhydrous, 10 mmol) was dissolved in aqueous sodium hydroxide (5% W/W, 28.4 g), the solution was cooled in an ice bath, and (S)-propylene oxide (9.3 g, 160 mmol) was added to it slowly. The solution became hazy and remained thus for the next 6 h while it was stirred in the ice bath. Thereafter warming to room temperature resulted in a complete clarification. After an additional 39 h of stirring the mixture was neutralized and dialyzed as in Example 1. The retained solution was evaporated under reduced pressure to yield a thick syrup which upon coevaporation with ethanol (190 proof, 2×100 ml) gave a white foam. That was stirred with ethyl acetate (75 ml) for 30 min, filtered, dried, and lyophilized to obtain a white amorphous powder of the product (yield 18.5 g). The degree of substitution calculated from nuclear magnetic resonance spectrum was 10.9 and from $^{252}$Cf plasma desorption mass spectrum was 9.9.

Preparation of permethylated derivative and its analysis was performed as in Example 1.

EXAMPLE 3

Preparation of (S)-2-Hydroxypropyl-β-Cyclodextrin Mixture

β-Cyclodextrin (2.3 g hydrate, i.e., 2 g anhydrous, 1.76 mmol) was dissolved in aqueous sodium hydroxide (1.5% W/W, 9.4 g) by stirring at 60° C. The solution was cooled in an ice bath and (S)-propylene oxide (2 g, 34.4 mmol) was slowly added. After 5 h an ice bath reaction was left to proceed for 36 h at room temperature and processed as in Example 1 to yield 2.8 g of product. The average degree of substitution by nuclear magnetic resonance spectroscopy was 7.6, by $^{252}$Cf plasma desorption mass spectrometry 8.6. The sample of the product was permethylated and analyzed by a procedure as described in Example 1.

EXAMPLE 4

Effect of Cations on the Base Catalyzed Alkylation of β-Cyclodextrin with Propylene Oxide β-Cyclodextrin (6.44 g, corresponding to 5.60 g of anhydrous compound, 4.94 mmol) was dissolved in each case in 25 ml of a 0.4 N base solution (the bases used were LiOH, NaOH, KOH, Ba(OH)$_2$, and NMe$_4$OH) by warming at 60° C. for 15 min. The clear solution was cooled in an ice bath and S-(−)propylene oxide (4.06 g, 70 mmol) was introduced over a 30 min period. The mixture was stirred in an ice bath for 12 h and then at room temperature for 4 h. The mixture was then neutralized with hydrochloric acid and dialyzed against distilled water for 6 h at room temperature. The retained solutions were evaporated under reduced pressure and the residues dried in vacuum, yielding between 6.2 and 6.9 g of products which were analized as described in Example 1.

EXAMPLE 5

Mono(2-hydroxypropyl)cyclodextrins

The respective cyclodextrin was dissolved in 1.5% W/W NaOH solution by stirring at room temperature (at 60° C. in case of β-cyclodextrin) for 20 min. The solution was cooled in an ice bath and propylene oxide was introduced over a period of 1 h (the flask was equipped with a condenser containing a mixture of acetone-dry ice). The mixture was stirred in the ice bath for 5–10 h and then at room temperature for 8–10 h. The exact quantities of the reactants and the reaction conditions are summarized in Table 1. The reaction mixture was cooled in an ice bath and neutralized with hydrochloric acid. To isolate the respective products different procedures were used as described in detail below.

Mono[(S)-2-Hydroxypropyl]-α-Cyclodextrin

α-Cyclodextrin, which precipitated upon cooling and neutralization of reaction mixture, was filtered off. The filtrate was concentrated to about 200 ml, and then dialized for 6 h at room temperature against distilled water. The retained solution was diluted to 550 ml and stirred with cyclohexane (60 ml) for 24 h. The precipitated complex of α-cyclodextrin and cyclohexane was filtered off, the filtrate concentrated to 130 ml, and again stirred with cyclohexane (30 ml) for 10 h and then filtered. The filtrate was decolorized with charcoal (norit, 9 g) at 60° C. Thin layer chromatography of the colorless solution showed some α-cyclodextrin was still to be present. The solution was concentrated to 35 ml, stirred once again with cyclohexane (10 ml) for 5 h, and filtered. The filtrate was evaporated and the residue dried by coevaporation with absolute ethanol (2×50 ml) to obtain the product. $R_f$ 0.28 (1-propanol-water-ethyl acetate-ammonium hydroxide, 6:3:1:1) FIG. 3. MS ($^{252}$Cf) m/e 1053.1 (M+Na$^+$). The mass spectrum shows that there is a contamination (14%) by bis substituted compound m/e 1111.0 (M+Na$^+$). MS (FAB+) m/e 1053.3 (M+Na$^+$), impurity of bis substituted compound m/e 1111.3 (M+Na$^+$). $^1$H-NMR (D$_2$O) δ5.28–5.18 and 5.15–4.97 (m, 6H, H-1), 4.16–3.42 (m, 39H), 1.16 (d, J=6.4 Hz, 3H, CH$_3$). Anal. for C$_{39}$H$_{66}$O$_{31}$·7H$_2$O; calcd. C 40.45, H 6.91; found C 40.37, H 6.58. The solubility of the compound in water was found >50%.

2-O-[(S)-2'-Hydroxypropyl]-β-cyclodextrin

The suspension obtained upon cooling a neutralization of reaction mixture was concentrated to 600 ml and dialyzed for 7 h at room temperature. The retained suspension (∫700 ml) was stirred with toluene (10 ml) for 14 h, water (500 ml) was added, stirred for 15 min, and filtered. The residue was suspended in water (1.25 L), stirred for 1 h, and filtered. The combined filtrates were concentrated to 200 ml, refrigerated overnight, the solid was collected by filtration, and recrystallized from hot water to yield white crystals of the product. $R_f$ 0.25 (1-propanol-water-ethyl acetate-ammonium hydroxide, 6:3:1:1), FIG. 1. M.P. 292°–293° C. MS (FAB+) m/e 1193.2 (M+H$^+$), 1210.3 (M+H$_2$O). MS (FAB−) m/e 1191.1 (M−H$^+$), 1210.2 (M+H$_2$O). MS ($^{252}$Cf) m/e 1215.8 (M+Na$^+$). $^1$H-NMR (D$_2$O) δ5.30–5.23 and 5.17–5.05 (m, 7H, H-1), 4.16–3.40 (m, 45H), 1.17 (d, J=6.42, 3H, CH$_3$). Anal. for C$_{45}$H$_{76}$O$_{36}$·3H$_2$O; calcd. C 43.30, H 6.58; found C 43.31, H 6.43. Solubility of this compound in water was found to be 3.2 mg/ml and was only insignificantly changed when excess of toluene was added to the aqueous phase.

The sulfatation of the title compound was performed as follows. Chlorosulfonic acid (0.4 ml) was added to pyridine (2 ml) while the temperature was kept under 10° C. Thereafter, a powder of anhydrous cyclodextrin derivative (0.2 g) was added, the mixture stirred for 1 h at 70° C., decomposed under cooling by water (4 ml), concentrated under reduced pressure, neutralized with sodium hydroxide, decolorized with activated charcoal (0.5 g), and dialyzed against water for 24 h. Evaporation of the retain solution yielded a colorless product (0.494 g). Elemental analysis results: C, 14.45%; H, 2.618%; S, 17.92%. Ratio of the sulfur to carbon contents is 1.24 which corresponds to the complete sulfatation of all hydroxyls. The solubility of the product in water was in excess to 50%.

2-O-[(R)-2'-Hydoxypropyl]-β-cyclodextrin

The suspension obtained upon cooling and neutralization of the reaction mixture was filtered and both the residue and filtrate conserved. The filtrate was stirred with toluene (50 ml) for 12 h and filtered; the filtrate showed only a trace presence of the product on t.l.c. and was therefore discarded. The residue obtained initially was suspended in water (500 ml) and stirred with toluene (50 ml) for 12 h. Water (100 ml) was added, stirred for 1 h, filtered, the residue was washed with water (200 ml), and the combined filtrates were evaporated. Recrystallization of the residue from hot water (200 ml) afforded white crystal of the product. $R_f$ 0.25 (1-propanol-water-ethyl acetate-ammonium hydroxide, 6:3:1:1), FIG. 1. M.p. 290°–292° C. MS (FAB+) m/e 1193.2 (M+H+), 1210.3 (M−H$_2$O). MS (FAB−) m/e 1191.3 (M−H+). MS ($^{252}$Cf) m/e 1215.7 (M+Na+). $^1$H-NMR D$_2$O) δ5.30–5.22 and 5.20–5.07 (m, 7H, H-1), 4.20–3.49 (m, 45H), 1.20 (d, J=6.24 Hz, 3H, CH$_3$). Anal. for C$_{45}$H$_{76}$O$_{36}$·5H$_2$O; calcd. C 42.12, H 6.71; found C 41.94, H 6.88. The solubility of this compound in water was found to be 7.5 mg/ml.

2-O-[(RS)-2'-Hydroxypropyl]-β-cyclodextrin

The work-up procedure was the same to that for (R)-diastereomer. $R_f$ 0.25 (1-propanol-water-ethyl acetate-ammonium hydroxide, 6:3:1:1). M.p >300° C. MS ($^{252}$Cf) m/e 1215.6 (M+Na+). MS (FAB+) m/e 1193.3 (M+H+). $^1$H-NMR (D$_2$O) δ5.26–5.18 and 5.15–5.02 (m, 7H, H-1), 4.20–3.42 (m, 45H), 1.16 and 1.15 (d, J=6.42 Hz, 3H, CH$_3$). Anal. for C$_{45}$H$_{76}$O$_{36}$·5H$_2$O; calcd. C 42.12, H 6.71; found C 42.11, H 6.76. The solubility of the title compound in water was found to be 4.0 mg/ml.

Mono(S-2'-Hydroxypropyl)-γ-cyclodextrin

γ-Cyclodextrin, which precipitated upon cooling and neutralization of the reaction mixture, was filtered off and the filtrate stirred with p-cymene (55 ml) for 12 h. The precipitated complex was filtered off and the filtrate was concentrated to 200 ml and dialyzed for 6 h at room temperature. The retained solution was concentrated to 100 ml, stirred with p-cymene (20 ml) for 10 h, and filtered. The filtrate was decolorized with decolorizing charcoal, norit (9 g) at 60° C. The colorless solution was evaporated and the residue dried by coevaporation with absolute ethanol (2×50 ml) to obtain the title compound. $R_f$ 0.21 (1-propanol-water-ethyl acetate-ammonium hydroxide, 6:3:1:1), FIG. 1. MS ($^{252}$Cf) m/e 1377.8 (M+Na+). The mass spectrum shows that there is also contamination (18%) by disubstituted compound, m/e 1436.5 (M+Na+). MS (FAB+) m/e 1377.7 (M+Na+), impurity of disubstituted compound 1435.7 (M+Na+). Anal. for C$_{51}$H$_{86}$O$_{41}$·4H$_2$O; Calcd. C 42.80, H 6.57; found C 42.82, H 6.60. The solubility of 5 in water was found to be >50%.

6-O-[(S)-2'-Hydroxypropyl-β-Cyclodextrin

β-Cyclodextrin (37.6 g, corresponding to 32.71 g anhydrous compound, 28.82 mmol) was dissolved in an aqueous solution of 30% W/W NaOH (144 ml), cooled in an ice bath and introduced S-(−)-propylene oxide (2 g, 34.48 mmol) over a 10 min period. After stirring for 10 h at ice bath temperature and then for 8 h at room temperature, the reaction mixture was neutralized (while cooling in an ice bath) with hydrochloric acid and the resulting suspension dialyzed for 8 h at room temperature against distilled water. The retained suspension (∼700 ml) was filtered. The residue (18.55 g) was exclusively β-cyclodextrin and consequently was discarded. The filtrate was concentrated to 150 ml, stirred with toluene (30 ml) for 18 h, and filtered. This residue (18.5 g) was a mixture of toluene complex of β-cyclodextrin and the title compound. The complex was decomposed by boiling off with water (2×200 ml) under reducd pressure (60° C.) to obtain a mixture of cyclodextrin and the product (16.4 g). FIG. 2 shows the comparative mobilities of 2 and 6 on t.l.c. (1-propanol-water-ethyl acetate-ammonium hydroxide, 6:3:1:1, was used as a developing system). While the compound which had the hydroxypropyl substituent on C-2 hydroxyl appears at $R_f$ 0.25, the title compound having which had the same substituent on C-6 hydroxyl appears distinctly at $R_f$ 0.23. From the plasma desorption ($^{252}$Cf, positive ion) spectrum the ratio of β-cyclodextrin:monohydroxypropyl derivative:bis-hydroxypropyl derivative in the mixture appears to be 30:58:12.

EXAMPLE 7

2-O-[(S)-2', 3'-Dihydroxypropyl-β-cyclodextrin

β-Cyclodextrin (26.45 g, corresponding to 23.01 g of anhydrous compound, 20.27 mmol) was dissolved in 1.5% W/W NaOH (100 ml) by stirring for 15 min, cooled in an ice bath, and added (S)-glycidol (1 g, 13.51 mmol) over a 15 min period. The mixture was stirred in an ice bath for 12 h and then at room temperature for 24 h. Then the mixture was cooled again in an ice bath, neutralized with hydrochloric acid to pH 7.0–7.5 and dialyzed for 7 h against distilled water. The retained solution was stirred with toluene (10 ml) for 24 h, the precipitated toluene complex of the unreacted β-cyclodextrin was filtered off (20.8 g), and washed with water (50 ml). The combined filtrates were evaporated to obtain crude product (5.69 g) which was recrystallized from hot water to obtain the pure title compound as colorless crystals (3.0 g). $R_f$ 0.2 (1-propanol-water-ethyl acetate-ammonium hydroxide, 6:3:1:1). M.p >300° C. MS (FAB+) m/e 1209.4 (M+H+). $^1$H-NMR (D$_2$O) ε5.25–5.22 (m, 1H, H-1), 5.15–5.03 (m, 6H, H-1), 4.15–3.47 (, 47H). The solubility of the product in water was found to be 12.0 mg/ml.

The compound was permethylated and that derivative subjected to hydrolysis, reduction, and acetylation. Analysis of the resulting alditol derivatives revealed the following molar percentages of glucose residues in the product: unsubstituted, 87.5; 2-O-substituted, 11.5; 3-O-substituted, 1.0. These results favorably compare with the calculated value: substituted, 85.7%; 2-O-substituted, 14.3%.

EXAMPLE 8

Reaction of 2-O-[(S)-2'-Hydroxypropyl]-β-Cyclodextrin with Ammonia Catalyzed with Raney Nickel To a suspension of W-2 Raney Nickel (2 ml settled volume, Aldrich Chemical Co.) in concentrated ammonium hydroxide (8 ml) was added 2-O-[(S)-2'-hydroxyproyl]-β-cyclodextrin (300 mg) and the mixture was heated at 190°–200° C. in a steel bomb for 36 h. The mixture was then filtered, the catalyst washed with water (60 ml), and the filtrate dialyzed for 4 h. The retained solution was filtered through membrane filter (0.4µ) and evaporated to yield an off-white solid (100 mg). $R_f$ 0.19 (1-propanol-water-ethyl acetate-ammonium hydroxide, 6:3:1:1). Elemental analysis results: C, 44.01%; H, 7.04%; N, 2.22%. Ratio of nitrogen to carbon is 0.0504, i.e., close to two hydroxy groups were exchanged for amino groups. The solubility of the compound in water was 20 mg/ml.

Reaction of β-cyclodextrin with Raney Nickel-Ammonia

The reaction was carried out under similar conditions as above using W-2 Raney Nickel (6 ml, settled volume), concentrated ammonium hydroxide (15 ml), and β-cyclodextrin (600 mg). Work up as above afforded an off-white solid (470 mg). Elemental analysis results: C, 44.10; H, 6.62; N, 2.52; ash content, 3.05%). Ratio of nitrogen to carbon is 0.0571. The solubility of the compound in water was 25 mg/ml.

TABLE 1

EFFECT OF MACRO-RING SIZE ON CONDENSATION OF CYCLODEXTRINS WITH PROPYLENE OXIDE

| starting cyclodextrin | average degree of substitution | $k_3/k_2$ | $k_6/k_2$ relative reactivity[a] | $S_0$ | $S_2'$ | $S_2$ | $S_3$ | $S_6$ | $S_{23}$ | $S_{26}$ | $S_{36}$ | $S_{236}$ |
|---|---|---|---|---|---|---|---|---|---|---|---|---|
| | | | | \multicolumn{9}{c}{composition of glucose ethers in hydrolysate[b]} |
| α | 5.5 | 0.18 | 0.43 | 32.2 | — | 29.4 | 4.4 | 11.0 | 7.7 | 10.2 | 1.9 | 3.2 |
| β | 5.5 | 0.27 | 0.32 | 43.0 | 0.6 | 23.6 | 6.6 | 7.3 | 9.6 | 5.2 | 1.6 | 2.4 |
| γ | 6.9 | 0.24 | 0.40 | 33.7 | — | 25.2 | 5.7 | 8.1 | 11.3 | 8.7 | 2.5 | 4.7 |

[a]Subscript denotes position.
[b]Molar percent. $S_0$ denotes unsubstituted glucose; $S'_2$ denotes 2-O-(2-hydroxy-1-methylethyl)glucose; $S_2$ denotes 2-O-(2-hydroxypropyl)glucose; $S_{23}$ denotes 2,3-O-di(2-hydroxypropyl)glucose; same system used in other abbreviations.

TABLE 2

EFFECTS OF AVERAGE DEGREE OF SUBSTITUTION ON THE COMPOSITION OF PRODUCT IN REACTION OF β-CYCLODEXTRIN WITH PROPYLENE OXIDE[a]

| average degree of substitution | $k_3/k_2$ | $k_6/k_2$ | $S_0$ | $S_2$ | $S_3$ | $S_6$ | $S_{23}$ | $S_{26}$ | $S_{36}$ | $S_{236}$ |
|---|---|---|---|---|---|---|---|---|---|---|
| 2.0 | 0.36 | 0.08 | 74.4 | 14.6 | 4.8 | 2.6 | 2.2 | 0.9 | 0.5 | — |
| 6.6 | 0.19 | 0.15 | 34.7 | 28.7 | 5.7 | 5.0 | 14.5 | 6.2 | 1.9 | 3.3 |

[a]For explanation of symbols, see Table 1.

TABLE 3

EFFECT OF VARIOUS BASES ON CONDENSATION OF β-CYCLODEXTRIN WITH (S)-PROPYLENE OXIDE[a]

| base used | average degree of substitution | from hydrolysis | $k_3/k_2$ | $k_6/k_2$ | $S_0$ | $S_2$ | $S_3$ | $S_6$ | $S_{23}$ | $S_{26}$ | $S_{36}$ | $S_{236}$ |
|---|---|---|---|---|---|---|---|---|---|---|---|---|
| LiOH | 2.5 | 2.5 | 0.27 | 0.12 | 67.9 | 19.8 | 5.9 | 2.2 | 3.3 | 0.8 | — | — |
| NaOH | 2.0 | 2.0 | 0.36 | 0.08 | 74.4 | 14.6 | 4.8 | 2.6 | 2.2 | 0.9 | 0.5 | — |
| KOH | 2.5 | 2.5 | 0.31 | 0.07 | 69.8 | 17.7 | 5.7 | 1.8 | 3.4 | 0.8 | 0.8 | — |
| Ba(OH)$_2$ | 1.3 | 1.3 | 0.36 | 0.18 | 83.3 | 9.9 | 3.6 | 1.2 | 1.0 | 0.2 | 0.5 | 0.3 |
| NMe$_4$OH | 3.6 | 3.6 | 0.32 | 0.16 | 57.7 | 23.1 | 7.4 | 2.7 | 6.0 | 1.5 | 1.0 | 0.5 |

[a]For explanation of symbols, see Table 1.

TABLE 4

MONO-ALKYLATION OF CYCLODEXTRINS WITH PROPYLENE OXIDE

| cyclodextrin | Reaction Conditions | | | | Yield (g) | Recovered cyclodextrin complex (g) |
|---|---|---|---|---|---|---|
| | carbohydrate g (mol) | propylene oxide g (mol) | vol. of 1.5% W/W NaOH, ml | temp./ time, h | | |
| α | 222 (0.206) | S-(−), 8.3 (0.143) | 800 | ice bath/10 room temp/9 | 6.18 | 166.2[a,b] |
| β | 282.5 (0.216) | S-(−), 10 (0.172) | 1000 | ice bath/5 room temp/10 | 8.0 | 293[c] |
| β | 188 (0.144) | R-(+), 6.64 (0.114) | 720 | ice bath/10 room temp/8 | 10.7 | 193[c] |
| β | 188 (0.144) | (R,S), 6.64 (0.114) | 720 | ice bath/10 room temp/8 | 7.5 | 195[c] |
| γ | 293.6 (0.197) | S-(−), 7.90 (0.136) | 715 | ice bath/10 room temp/8 | 12.5 | 360.3[d] |

[a]Recovered as cyclohexane complex.
[b]In addition to the complex 89 g of free cyclodextrin was also recovered.
[c]Recovered as toluene complex.
[d]Recovered as p-cymene complex.

TABLE 5

COMPOSITION OF MONOSUBSTITUTED CYCLODEXTRINS[a]

| starting cyclodextrin | average degree of substitution | $S_0$ | $S'_2$ | $S_2$ | $S_3$ | $S_6$ | $S_{23}$ |
|---|---|---|---|---|---|---|---|
| α | 0.88 | 85.5 | | 8.5 | 6.1 | — | — |
| β | 0.95 | 86.5 | | 13.5 | — | — | — |
| γ | 0.97 | 87.0 | 0.3 | 6.7 | 4.5 | 0.4 | 0.1 |

[a]Products of reaction where aqueous 1.5% NaOH was used as solvent and catalyst. For explanation of symbols, see Table 1.

We claim:

1. A process for producing monosubstituted alpha-, betha- and gamma-cyclodextrins which comprises the step of condensing an excess of at least one cyclodextrin with an epoxide under alkaline conditions.

2. The process of claim 1, wherein the epoxide is selected from the group consisting of (R)-propylene oxide, (S)-propylene oxide, (R,S)-propylene oxide and glycidol.

3. The process of claim 2, wherein the alkaline conditions are created using a base selected from the group consisting of sodium hydroxide, lithium hydroxide, potassium hydroxide, tetramethylammonium hydroxide, and barium hydroxide.

4. The process of claim 1, wherein the alkaline conditions are created using a base selected from the group consisting of sodium hydroxide, lithium hydroxide, potassium hydroxide, tetramethylammonium hydroxide, and barium hydroxide.

5. The process of claim 4, wherein the base used is sodium hydroxide.

6. The process of claim 1, wherein said monosubstituted cyclodextrin is a substituted alpha-cyclodextrin.

7. The process of claim 1, wherein said monosubstituted cyclodextrin is a substituted beta-cyclodextrin.

8. The process of claim 1, wherein said monosubstituted cyclodextrin is a substituted gamma-cyclodextrin.

9. The process of claim 1, wherein the produced cyclodextrin is selected from the froup consisting of mono((S)-2-hydroxypropyl)-alpha-cyclodextrin, 2-O-((S)-2'-hydroxypropyl)-beta-cyclodextrin, 2-O-((R)-2'-hydroxypropyl)-beta-cyclodextrin, 2-O-((RS)-2'-hydroxypropyl)-beta-cyclodextrin, mono((S)-2'-hydroxypropyl)-gamma-cyclodextrin, 6-((S)-2'-hydroxypropyl)-beta-cyclodextrin, and 2-O-((S)-2',3'-dihydroxypropyl-beta-cyclodextrin.

10. The process of claim 1, wherein said condensation step is conducted below room temperature and the condensation product mixture is then subsequently neutralized and recovered.

11. A process for increasing the solubility of cyclodextrins which comprises the step of reacting cyclodextrins with amines under heterogenous catalytic conditions by exposing the cyclodextrins to ammonia and Raney nickel.

12. A process for producing monosubstituted alpha-, beta-and gamma-cyclodextrins which comprises the step of condensing an excess of at least one cyclodextrin with an epoxide comprising propylene oxide or glycidol in the presence of a base selected from the group consisting of sodium hydroxide, lithium hydroxide, potassium hydroxide, tetramethylammonium hydroxide and barium hydroxide.

13. The process of claim 12, wherein said condensation step is conducted below room temperature and the condensation product mixture is then subsequently neutralized and recovered.

14. A composition of matter comprising at least one cyclodextrin, ammonia, and Raney nickel.

15. A composition of matter comprising chlorosulfonic acid, pyridine, and at least one cyclodextrin.

* * * * *